(12) United States Patent
Chen et al.

(10) Patent No.: US 12,099,633 B2
(45) Date of Patent: *Sep. 24, 2024

(54) AUTOMATICALLY ANONYMIZING DATA IN A DISTRIBUTED STORAGE SYSTEM

(71) Applicant: RED HAT, INC., Raleigh, NC (US)

(72) Inventors: Huamin Chen, Westford, MA (US); Yuval Lifshitz, Kfar HaOranim (IL); Daniel Gryniewicz, Ann Arbor, MI (US)

(73) Assignee: RED HAT, INC., Raleigh, NC (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/080,099

(22) Filed: Dec. 13, 2022

(65) Prior Publication Data

US 2023/0124528 A1  Apr. 20, 2023

Related U.S. Application Data

(63) Continuation of application No. 17/380,141, filed on Jul. 20, 2021, now Pat. No. 11,550,955.

(51) Int. Cl.
*G06F 21/62* (2013.01)
*H04L 67/1097* (2022.01)

(52) U.S. Cl.
CPC ...... *G06F 21/6254* (2013.01); *H04L 67/1097* (2013.01)

(58) Field of Classification Search
CPC .............. G06F 21/6254; H04L 67/1097
See application file for complete search history.

(56) References Cited

U.S. PATENT DOCUMENTS

| 7,921,328 | B1 | 4/2011 | Gulati et al. |
| 8,856,202 | B2 | 10/2014 | Mccabe et al. |
| 8,886,743 | B2 * | 11/2014 | Jowett ................ H04L 9/40 709/216 |
| 2009/0288141 | A1 * | 11/2009 | Khachaturov ........ G06F 21/577 707/999.005 |
| 2011/0110568 | A1 * | 5/2011 | Vesper ................. G06Q 10/10 382/128 |
| 2019/0080115 | A1 * | 3/2019 | Dongre ............... H04L 63/0407 |
| 2020/0159952 | A1 * | 5/2020 | Dain ................... G06F 21/6227 |

(Continued)

FOREIGN PATENT DOCUMENTS

| DE | 102021208233 A1 * | 2/2023 | ......... G06F 21/6254 |
| EP | 3817002 A1 * | 5/2021 | ......... G06F 21/6254 |

(Continued)

*Primary Examiner* — Shean Tokuta
(74) *Attorney, Agent, or Firm* — Kilpatrick Townsend & Stockton LLP

(57) ABSTRACT

Data can be automatically anonymized in a distributed storage system. For example, a system can receive a notification indicating that an object is stored in a non-persistent bucket of a distributed storage system. The system can read the object from the non-persistent bucket in response to receiving the notification. The system can generate an anonymized version of the object by performing one or more anonymization operations with respect to the object. The system can store the anonymized version of the object in a persistent bucket of the distributed storage system. The system can then transmit a command for causing the object to be removed from the non-persistent bucket.

20 Claims, 8 Drawing Sheets

(56) References Cited

U.S. PATENT DOCUMENTS

| | | | |
|---|---|---|---|
| 2020/0344237 A1* | 10/2020 | Murdoch | H04L 63/102 |
| 2021/0019063 A1 | 1/2021 | Lee et al. | |
| 2021/0097189 A1* | 4/2021 | Miller | G06F 21/53 |
| 2021/0097202 A1* | 4/2021 | Datta | G06F 21/36 |
| 2021/0117142 A1* | 4/2021 | Sugiyama | G06F 3/1234 |
| 2021/0182429 A1* | 6/2021 | Chen | H04L 51/10 |
| 2021/0263669 A1* | 8/2021 | Yang | G06F 11/3442 |
| 2022/0129582 A1* | 4/2022 | Lange | G10L 21/0232 |
| 2023/0021902 A1* | 1/2023 | Chen | H04L 67/1097 |
| 2023/0038409 A1* | 2/2023 | Datta | G06F 21/602 |
| 2023/0124528 A1* | 4/2023 | Chen | G06F 21/6254 |
| | | | 726/26 |

FOREIGN PATENT DOCUMENTS

| | | | |
|---|---|---|---|
| RU | 2638006 C2 * | 12/2017 | G06F 12/0246 |
| WO | WO-2009126839 A2 * | 10/2009 | G06F 21/10 |
| WO | WO-2016088755 A1 * | 6/2016 | G06F 16/285 |
| WO | WO-2021061820 A1 * | 4/2021 | G06F 13/1668 |
| WO | WO-2022225587 A1 * | 10/2022 | G06F 21/6254 |

* cited by examiner

AUTOMATICALLY ANONYMIZING DATA IN A DISTRIBUTED STORAGE SYSTEM

CROSS-REFERENCE TO RELATED APPLICATION

This is a continuation of and claims priority to U.S. patent application Ser. No. 17/380,141, filed Jul. 20, 2021, the entirety of which is hereby incorporated herein by reference.

TECHNICAL FIELD

The present disclosure relates generally to distributed storage systems. More specifically, but not by way of limitation, this disclosure relates to automatically anonymizing data in a distributed storage system.

BACKGROUND

Cloud computing systems provide on-demand access to a shared pool of computing resources, such as computing power and data storage. Some cloud computing systems include distributed storage systems for synchronizing, coordinating, and storing data. Such distributed storage systems include storage nodes that can work together so that the distributed storage system behaves as one storage system. Distributed storage systems can provide improvements to scalability, redundancy, and performance. For example, distributed storage systems can be easily scaled horizontally to include more or fewer storage nodes depending on demand. Distributed storage systems can also store multiple copies ("replicas") of the same data for high availability, backup, and disaster recovery purposes.

Distributed storage systems can implement file storage, block storage, or object storage techniques. File storage involves a hierarchical structure in which data is organized and represented as a hierarchy of files in folders. Block storage involves chunking data into arbitrarily organized, evenly sized volumes called "blocks." Each block has a unique identifier for allowing it to be placed wherever is most convenient in the distributed storage system. Object storage involves a flat (non-hierarchical) structure in which data is stored in discrete units called "objects," which may be kept in a repository. Each object is composed of the data itself, which can be any type of content, along with metadata about the data. The low cost and scalability of object storage has made it prevalent in public cloud storage systems.

DETAILED DESCRIPTION

Figure 1:
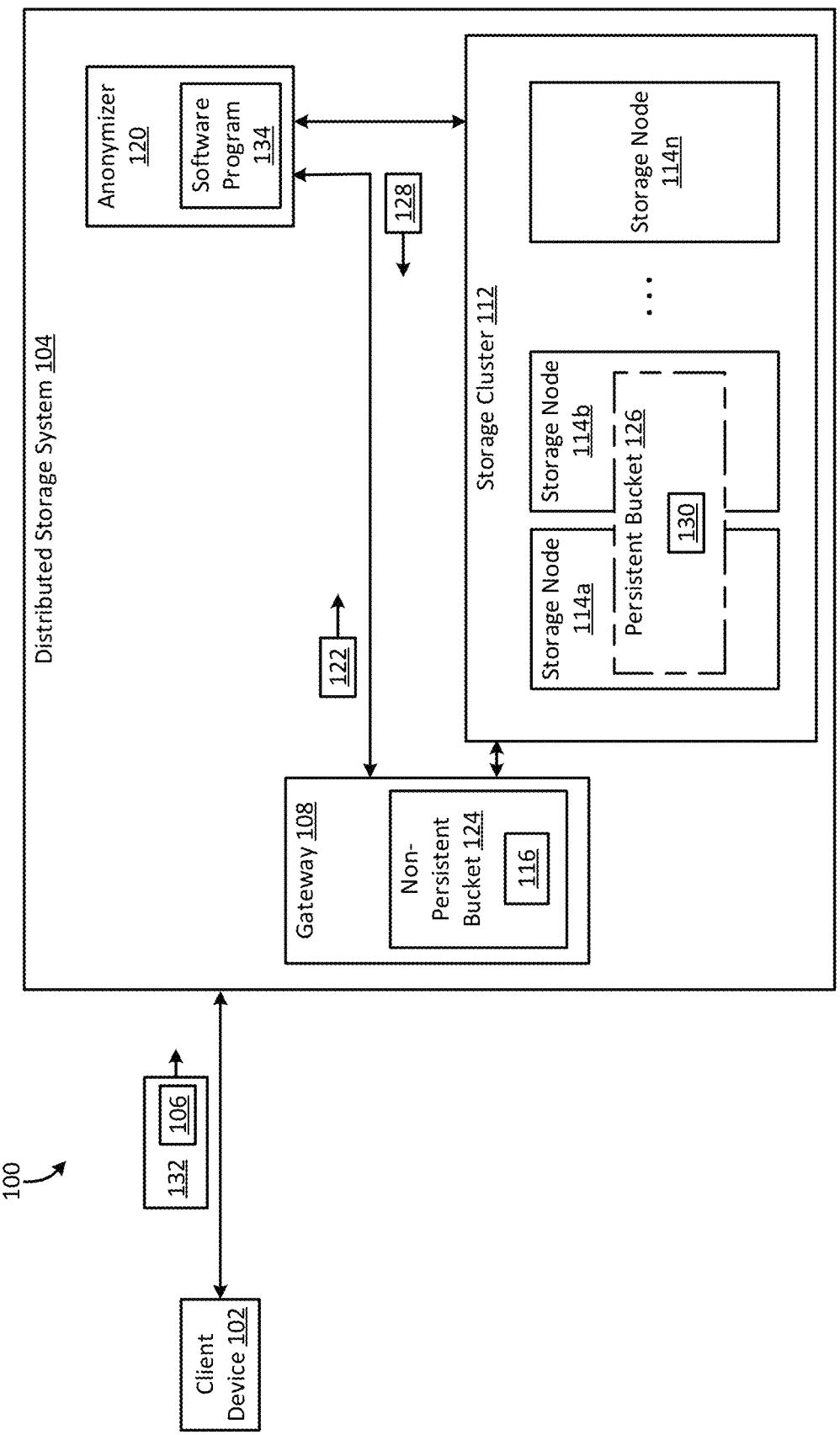
FIG. 1 shows a block diagram of an example of a system according to some aspects of the present disclosure.

Users are increasingly storing sensitive information on the Internet (e.g., in cloud storage systems) for a variety of reasons. Examples of such sensitive information may include names, addresses, phone numbers, e-mail addresses, social security numbers, Internet Protocol (IP) addresses, login identifiers, pin numbers, geolocation information, faces, license plate numbers, passport numbers, driver's license numbers, biometric information, or other personally identifiable information. As users increasingly store sensitive information online, many jurisdictions are taking steps to protect their security and privacy. These jurisdictions have expressed numerous concerns about storing sensitive information with cloud service providers and other service providers, given the increasing number of cyber-attacks and the proliferation of data leaks, which may disclose the sensitive information of millions of individuals. Some jurisdictions have passed laws or regulations requiring cloud service providers to store sensitive information in certain ways that improve security and privacy protections. While these additional measures are beneficial to end users, they can impose significant additional burdens on the service providers. For example, service providers may use complex encryption algorithms, isolated processors, sophisticated storage policies, and other protections to comply with laws or regulations. These protections may not only be financially expensive but also resource intensive to implement. Implementing these protections can also divert limited computing resources (e.g., processing power, memory, storage, and network bandwidth) away from other cloud functions, which may significantly impact the performance of the cloud infrastructure.

Some examples of the present disclosure can overcome one or more of the abovementioned problems by automatically anonymizing data before it is persistently stored in a distributed storage system. Anonymizing data can involve removing at least some sensitive information from the data. By automatically anonymizing the data before it is stored in a persistent manner in the distributed storage system, the service provider can better comply with laws and regulations regarding the safekeeping of sensitive information. This can also reduce the additional computational, storage, and security overhead that is typically associated with storing and maintaining sensitive information.

As one example, the distributed storage system can receive a request from a client device to upload data to the distributed storage system. The data can include any suitable type of content, such as an image, a video, an audio file, transactional data, or any combination of these. The data can include sensitive information. In response to receiving the request, the distributed storage system can store the data as an object in a non-persistent bucket of the distributed storage system. A bucket is a logical container for storing objects in a distributed storage system. A non-persistent bucket is a bucket that is backed by one or more volatile memory devices, such as random access memory (RAM) or cache memory. Upon storing the object in the non-persistent bucket, the distributed computing system can transmit a notification to anonymization software. The notification can indicate that the object is stored in the non-persistent bucket.

The anonymization software can be any suitable type of software program (e.g., a serverless function or a microservice) located internally or externally to the distributed storage system. The anonymization software can receive the notification, read the object from the non-persistent bucket, and execute one or more anonymization operations with respect to the object to generate an anonymized version of the object. An anonymization operation can be any computing operation configured to remove or obfuscate sensitive information. Examples of anonymization operations can include erasing a portion of an object, such as a portion of the object's data or the object's metadata; blurring, warping, or pixelating a portion of the object; or any combination of these. After generating the anonymized version of the object, the anonymization software can store the anonymized version of the object in a persistent bucket of the distributed storage system. A persistent bucket is a bucket that is backed by one or more non-volatile memory devices, such as a hard disk or a solid-state drive (SSD). After the anonymized version of the object is stored in the persistent bucket, the anonymization software can transmit a command to the distributed storage system for causing the object to be removed (e.g., erased) from the non-persistent bucket.

Using the above techniques, the sensitive information may only be present in the non-persistent bucket for a relatively short period of time (e.g., so that the distributed storage system can continue to perform certain storage operations). But in the background, transparently to the user of the client device, the data is automatically anonymized so that at least some of the sensitive information is removed or obfuscated before the data is stored persistently in the distributed storage system. This can improve security and privacy. For example, if the distributed storage system is subsequently infiltrated by a malicious actor, the malicious actor may only have access to the anonymized version of the data. Additionally, given the ephemeral nature of the non-persistent bucket, the sensitive information would be automatically removed from the non-persistent bucket if its backing memory shuts down, providing another layer of security.

In some examples, the anonymization software can be separate from other parts of the distributed storage system to improve the scalability of the anonymization software, reduce latency, and improve the efficiency of the distributed storage system. For example, the anonymization software can be implemented as a serverless function or a microservice that can be easily scaled up or down based on the load, thereby reducing latency and improving the efficiency of the distributed storage system. As another example, the anonymization software can be executed externally to the distributed storage system, to preserve the limited computing resources of the distributed storage system and improve the performance thereof. In some such examples, the anonymization software can communicate with the distributed storage system via a network using an application programming interface (API) to read the object from the non-persistent bucket and to store the anonymized version of the object to the persistent bucket.

While some examples are described herein in the context of object storage and buckets, the present disclosure is not intended to be limited to that context. Similar techniques can also be applied to file storage, block storage, and other storage mechanisms. For example, a distributed storage system can receive a request from a client device to upload data to the distributed storage system. In response, the distributed storage system can store the data as a file (or a block) in a volatile memory device. The distributed storage system can then transmit a notification to the anonymization software, which can generate an anonymized version of the file (or the block) and store the anonymized version in a non-volatile memory device. The anonymization software can then transmit a command to the distributed storage system for causing the file (or the block) to be removed from the volatile memory device.

These illustrative examples are given to introduce the reader to the general subject matter discussed here and are not intended to limit the scope of the disclosed concepts. The following sections describe various additional features and examples with reference to the drawings in which similar numerals indicate similar elements but, like the illustrative examples, should not be used to limit the present disclosure.

FIG. 1 shows a block diagram of an example of a system 100 according to some aspects of the present disclosure. The system 100 includes a client device 102 and a distributed storage system 104, which in some examples may be part of a cloud computing system. The client device 102 can be in communication with the distributed storage system 104 via a network, such as a local area network or the Internet. Examples of the client device 102 can include a laptop computer, desktop computer, mobile phone, or tablet. An example of the distributed storage system 104 can be Ceph.

In general, the distributed storage system 104 can receive an upload request 132 from the client device 102 for storing data 106 in the distributed storage system 104. In response to receiving the upload request 132, the distributed storage system 104 can store at least some of the data 106 in the distributed storage system 104. The distributed storage system 104 can also receive a read request from a requestor (e.g., the client device 102 or another computing device) to read the data 106 from the distributed storage system. In response to the read request, the distributed storage system 104 can transmit at least some of the data 106 to the requestor.

In some examples, the distributed storage system 104 can automatically anonymize the data 106 from the client device 102 prior to storing the data 106 in a persistent manner in the distributed storage system 104. To do so, the distributed storage system 104 can include various nodes, which may be physical machines or virtual machines. Examples of such nodes can include a gateway 108, an anonymizer 120, and storage nodes 114a-n. These nodes can operate as follows.

The client device 102 can transmit an upload request 132 for uploading data 106 to the distributed storage system 104. The upload request 132 can be received at the gateway 108. The gateway 108 is a node that includes an interface through which client devices can write content to the distributed storage system 104. The interface may also allow client devices to read content from the distributed storage system 104. In the context of Ceph, the gateway 108 can include an object storage gateway such as the RADOS Gateway (RGW), which includes an object storage interface built on top of the librados library to provide applications with a RESTful gateway to the storage cluster 112. In response to receiving the upload request 132, the gateway 108 can store the data 106 as an object 116 in a non-persistent bucket 124. In some examples, the gateway 108 can maintain a bucket index that includes a mapping of objects per bucket. The distributed storage system 104 can use the bucket index to rapidly determine which objects belong to which buckets, which may be useful for various reading and writing operations.

The non-persistent bucket 124 can be backed by one or more volatile memory devices of the distributed storage system 104. In some examples, at least one of the volatile memory devices may be part of the gateway 108, so that the non-persistent bucket 124 is at least partially located on the gateway 108 as shown in FIG. 1. Alternatively, all of the volatile memory devices may be located externally to the gateway 108, so that the non-persistent bucket 124 is located externally to the gateway 108. For example, the volatile memory devices can be coupled to storage nodes 114a-n of the storage cluster 112 and accessible to the gateway 108.

Regardless of the location of the volatile memory devices, the gateway 108 can store the object 116 in the non-persistent bucket 124. Based on storing the object 116 in the non-persistent bucket 124, the gateway 108 can transmit a notification 122 associated with the object 116 to the anonymizer 120. The notification 122 can indicate that the object 116 is stored in the non-persistent bucket 124.

The anonymizer 120 is a node that includes a software program 134 for anonymizing at least some of the data 106 uploaded by the client device 102. The software program 134 can receive the notification 122 and responsively read the object 116 from the non-persistent bucket 124. The software program 134 can then execute one or more anonymization operations with respect to the object 116. For example, the software program 134 can extract the data 106, the metadata, or both of these from the object 116. The software program 134 can analyze the data 106, the metadata, or both to identify sensitive information. For example, the software program 134 can perform image analysis, audio analysis, or textual analysis on the data 106, the metadata, or both to identify sensitive information. Having identified the sensitive information, the software program 134 can then remove or obfuscate the sensitive information to generate an anonymized version of the object 130.

For example, the data 106 can be an image and the software program 134 can remove, replace, blur, warp, or pixelate a portion of the image depicting the sensitive information to generate the anonymized version of the object 130. As another example, the data 106 can be a video and the software program 134 can remove, replace, blur, warp, or pixelate a portion of the audio content or the visual content of the video that has sensitive information to generate the anonymized version of the object 130. As yet another example, the data 106 can be transactional data and the software program 134 can remove, replace, encrypt, or hash a portion of the transactional data that has sensitive information to generate the anonymized version of the object 130.

After generating the anonymized version of the object 130, the software program 134 can store the anonymized version of the object 130 in a persistent bucket 126. The persistent bucket 126 is backed by one or more non-volatile memory devices that may span one or more storage nodes 114a-n of the storage cluster 112, such that the persistent bucket 126 can also be considered to span the one or more storage nodes 114a-n. After storing the anonymized version of the object 130 in the persistent bucket 126, the software program 134 can transmit a command 128 to the distributed storage system 104 (e.g., a component of the distributed storage system 104) for causing the distributed storage system 104 to remove the object 116 from the non-persistent bucket 124. For example, the software program 134 can transmit the command 128 to the gateway 108, which can receive the command 128 and responsively remove the object 116 from the non-persistent bucket 124. Using these techniques, the distributed storage system 104 may only retain the anonymized version of the object 130 long-term to provide improved security and privacy.

After the object 116 is removed from the non-persistent bucket 124, the gateway 108 may receive a read request for the data 106 from a requestor. The read request can be for reading the data 106 from the distributed storage system 104. The requestor can be the client device 102 or another computing device. In response to the read request, the gateway 108 can retrieve the anonymized version of the object 130 from the persistent bucket 126 and transmit it to the requestor. As a result, the requestor cannot access the sensitive information in the original data 106.

In some examples, the distributed storage system 104 can include other nodes for implementing other functionality. For example, the distributed storage system 104 can include a monitoring node configured to maintain a master copy of a cluster map. The cluster map indicates the current state of the distributed storage system 104. In the context of Ceph, the cluster map is a composite of maps, including the monitor map, the object storage daemon (OSD) map, and the placement group map. The monitoring node can update the cluster map to track a number of events, such as which processes exist in the storage cluster 112, which processes are running or down, whether placement groups are active or inactive, the total amount of storage space, and the amount of storage space used. The monitoring node can also perform other functions, such as authentication and logging services.

Although FIG. 1 shows a certain number and arrangement of components, this is for illustrative purposes and intended to be non-limiting. Other examples may include more components, fewer components, different components, or a different arrangement of the components shown in FIG. 1. For instance, in another example the non-persistent bucket 124 may be located on one or more of the storage nodes 114a-n of the storage cluster 112.

Figure 2:
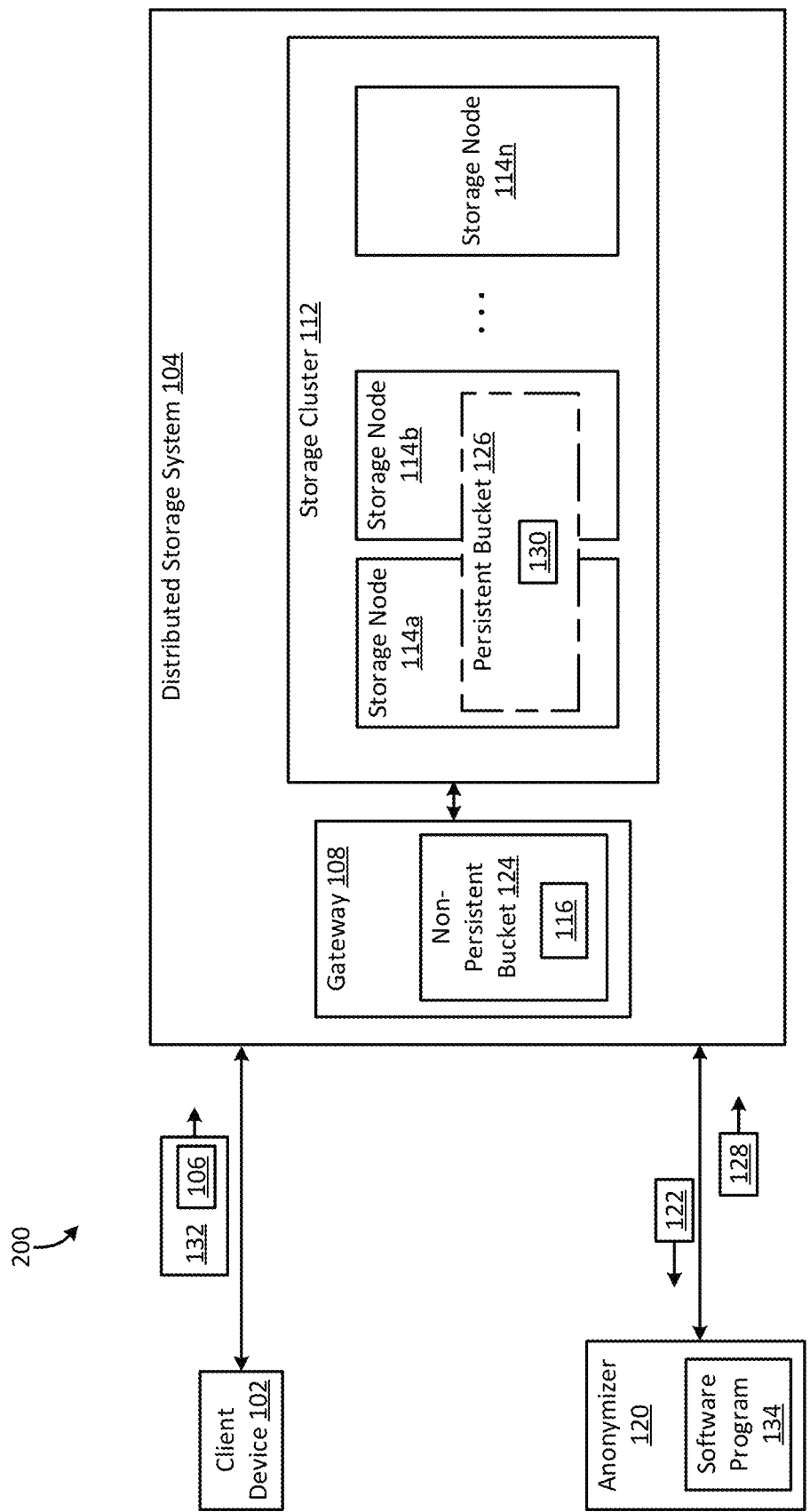
FIG. 2 shows a block diagram of another example of a system according to some aspects of the present disclosure.

FIG. 2 shows another example of a system 200 in which the anonymizer 120 is external to the distributed storage system 104. In this example, the distributed storage system 104 (e.g., the gateway 108 or another node) can transmit the notification 122 over a network to the software program 134. In response to receiving the notification 122, the software program 134 can read the object 116 from the non-persistent bucket 124. For example, the software program 134 can read the object 116 from the non-persistent bucket 124 by transmitting one or more API commands to an API of the distributed storage system 104. The software program 134 can then generate and store an anonymized version of the object 130 in the persistent bucket 126. The software program 134 may store the anonymized version of the object 130 in the persistent bucket 126 by transmitting one or more API commands to the API of the distributed storage system 104. After storing the anonymized version of the object 130 in the persistent bucket 126, the software program 134 can transmit a command 128 to the distributed storage system 104 (e.g., to the gateway 108 or another node) via the network for causing the object 116 to be removed from the non-persistent bucket 124.

Figure 3:
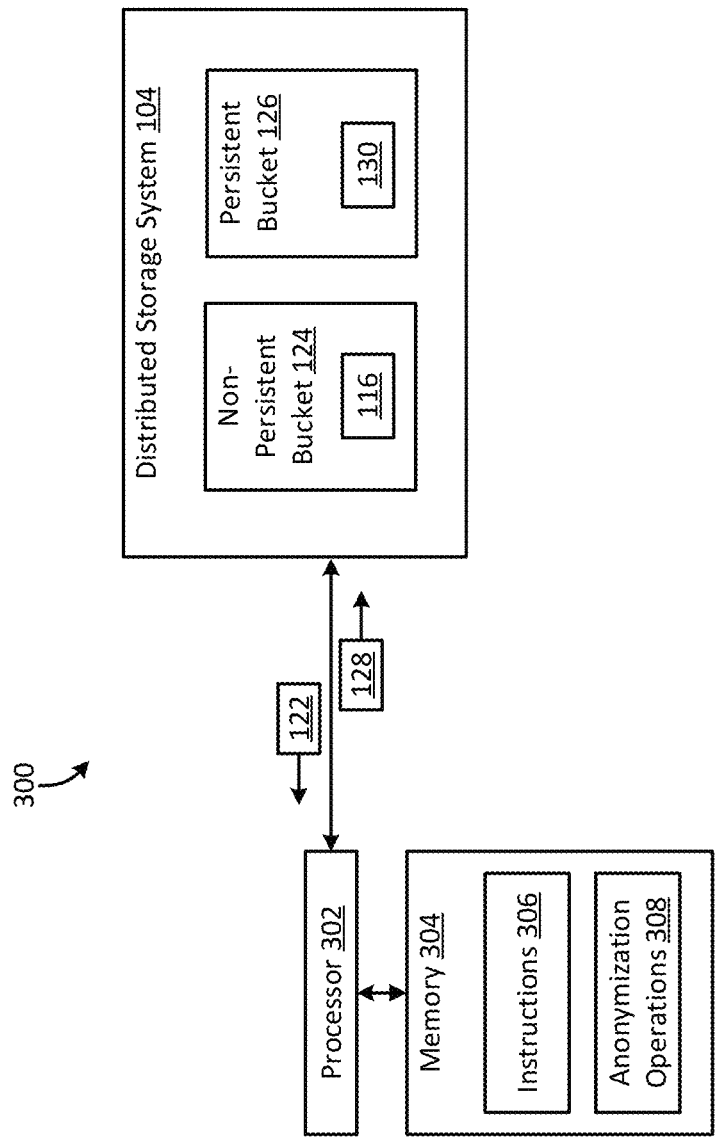
FIG. 3 shows a block diagram of yet another example of a system according to some aspects of the present disclosure.

FIG. 3 is a block diagram of an example of a system 300 according to some aspects of the present disclosure. The system 300 includes a processor 302 that is communicatively coupled to a memory 304. The processor 302 and the memory 304 can be configured to implement at least some of the functionality described above with respect to the software program 134. To that end, the processor 302 and the memory 304 may be internal to the distributed storage system 104 or external to the distributed storage system 104.

In some examples, the processor 302 and the memory 304 can be part of the same computing device. For example, the processor 302 and the memory 304 can be parts of the same node, such as the anonymizer 120 of FIG. 1. In other examples, the processor 302 and the memory 304 can be distributed from (e.g., remote to) one another.

The processor 302 can include one processor or multiple processors. Non-limiting examples of the processor 302 include a Field-Programmable Gate Array (FPGA), an application-specific integrated circuit (ASIC), or a microprocessor. The processor 302 can execute instructions 306 stored in the memory 304 to perform operations. The instructions 306 may include processor-specific instructions generated by a compiler or an interpreter from code written in any suitable computer-programming language, such as C, C++, C #, Java, or Python. In some examples, the instructions 306 can correspond to the software program 134 of FIG. 1.

The memory 304 can include one memory or multiple memories. The memory 304 can be volatile or non-volatile. Non-volatile memory includes any type of memory that retains stored information when powered off. Examples of the memory 304 include electrically erasable and programmable read-only memory (EEPROM) or flash memory. At least some of the memory 304 includes a non-transitory computer-readable medium from which the processor 302 can read instructions 306. A computer-readable medium can include electronic, optical, magnetic, or other storage devices capable of providing the processor 302 with computer-readable instructions or other program code. Examples of a non-transitory computer-readable medium can include a magnetic disk, a memory chip, ROM, random-access memory (RAM), an ASIC, a configured processor, and optical storage.

The processor 302 can execute the instructions 306 to perform operations. For example, the processor 302 can receive a notification 122 indicating that an object 116 is stored in a non-persistent bucket 124 of a distributed storage system 104. The processor 302 can read the object 116 from the non-persistent bucket 124 in response to receiving the notification 122. The processor 302 can then generate an anonymized version of the object 130 by performing one or more anonymization operations 308 with respect to the object 116. The processor 302 can store the anonymized version of the object 130 in a persistent bucket 126 of the distributed storage system 104. The processor 302 can then transmit a command 128 for causing the object 116 to be removed from the non-persistent bucket 124. These operations are further described below with respect to FIG. 4.

Figure 4:
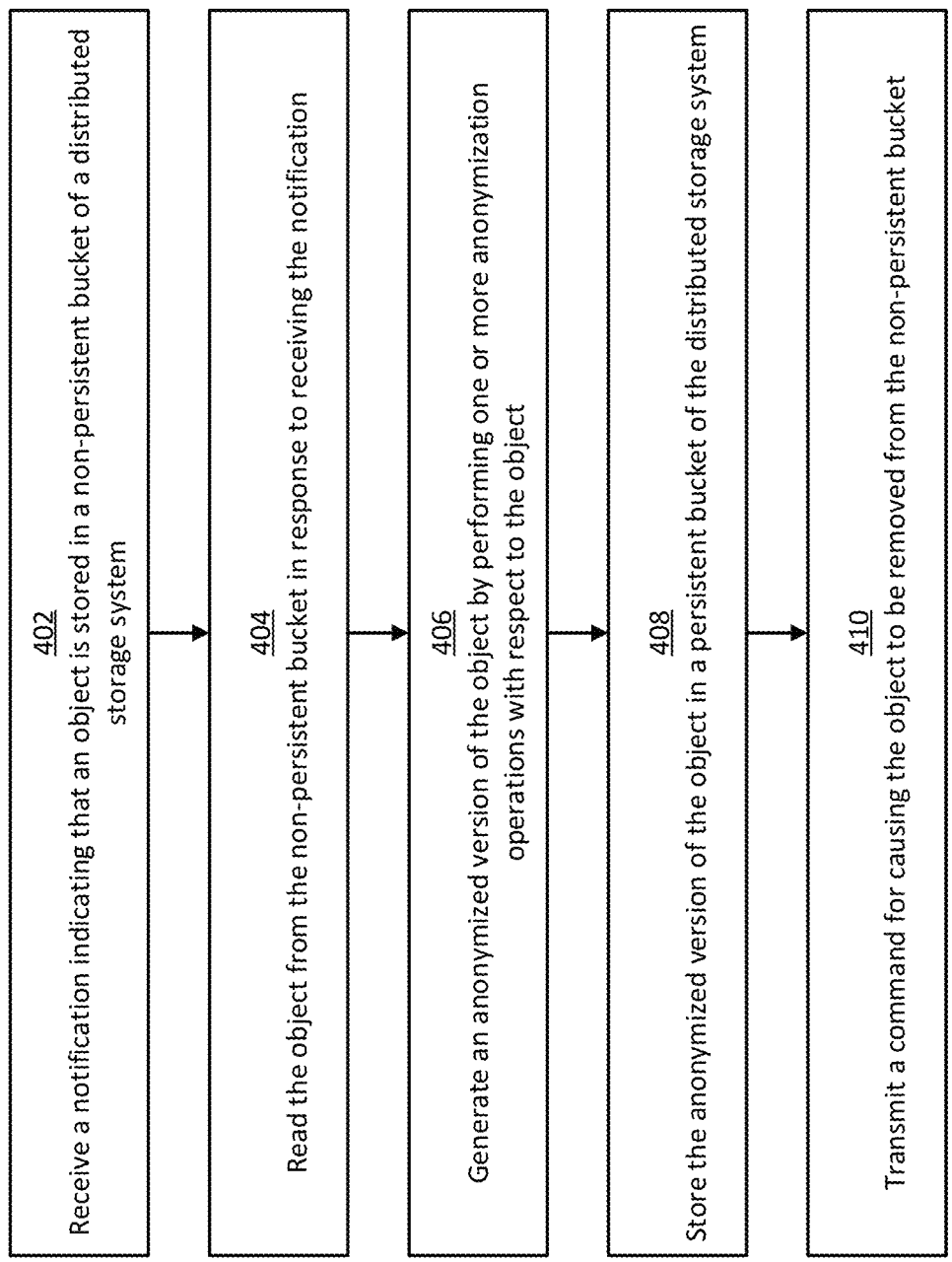
FIG. 4 shows a flow chart of an example of a process implemented by a software program according to some aspects of the present disclosure.

FIG. 4 shows a flow chart of an example of a process implemented by a software program 134 according to some aspects of the present disclosure. But other examples can include more steps, fewer steps, different steps, or a different order of the steps than is shown in FIG. 4. The steps of FIG. 4 are discussed below with reference to the components discussed above in relation to FIG. 3.

In block 402, the processor 302 receives a notification 122 indicating that an object 116 is stored in a non-persistent bucket 124 of a distributed storage system 104. The processor 302 can receive the notification 122 from a gateway 108 or another component of the distributed storage system 104.

In block 404, the processor 302 reads the object 116 from the non-persistent bucket 124 in response to receiving the notification 122. For example the processor 302 can transmit a read command to an API of the distributed storage system 104 for reading the object 116 from the non-persistent bucket 124. The distributed storage system 104 can receive the read command via the API, obtain the object 116 from a volatile memory device supporting the non-persistent bucket 124, and return the object 116 to the processor 302 via the API. As another example, the processor 302 can transmit a read command to the gateway 108, a storage node 114a, or another node of the distributed storage system 104. The node can receive the read command and responsively return the object 116 to the processor 302.

In block 406, the processor 302 generates an anonymized version of the object 130 by performing one or more anonymization operations 308 with respect to the object 116. If the object 116 includes an image file, the one or more anonymization operations 308 can include image-processing operations, such as scaling, warping, blurring, erasing, or pixelating the image. If the object includes an audio file, the one or more anonymization operations 308 can include audio-processing operations, such as modulating, filtering, erasing, compressing, adding or removing echo or reverb, or equalizing the audio. If the object includes a video file, the one or more anonymization operations 308 can include image-processing operations, audio-processing operations, or both of these. If the object 116 includes textual data, the one or more anonymization operations 308 can include erasing, encrypting, hashing, or replacing the text.

In block 408, the processor 302 stores the anonymized version of the object 130 in a persistent bucket 126 of the distributed storage system 104. Storing the anonymized version of the object 130 in a persistent bucket 126 can involve the processor 302 directly or indirectly causing the anonymized version of the object 130 to be stored in a persistent bucket 126. For example, the processor 302 can transmit a write command to an API of the distributed storage system 104 for writing the anonymized version of the object 130 to the persistent bucket 126. The distributed storage system 104 can receive the write command via the API and responsively store the anonymized version of the object 130 in a non-volatile memory device supporting the persistent bucket 126. As another example, the processor 302 can transmit a write command to a storage node 114a or another node of the distributed storage system 104. The node can receive the write command and responsively write the anonymized version of the object 130 to a non-volatile memory device supporting the persistent bucket 126.

In block 410, the processor 302 transmits a command 128 for causing the object 116 to be removed from the non-persistent bucket 124. In some examples, the processor 302 can transmit the command 128 to the gateway 108 for causing the gateway 108 to remove the object 118 from the non-persistent bucket 124. In other examples, the processor 302 can transmit the command 128 to another component of the distributed storage system 104 for causing the object 118 to be removed from the non-persistent bucket 124. For example, the processor 302 can transmit the command 128 to an API of the distributed storage system 104. The distributed storage system 104 can receive the command 128 via the API and responsively remove the object 116 from the non-persistent bucket 124.

Figure 5:
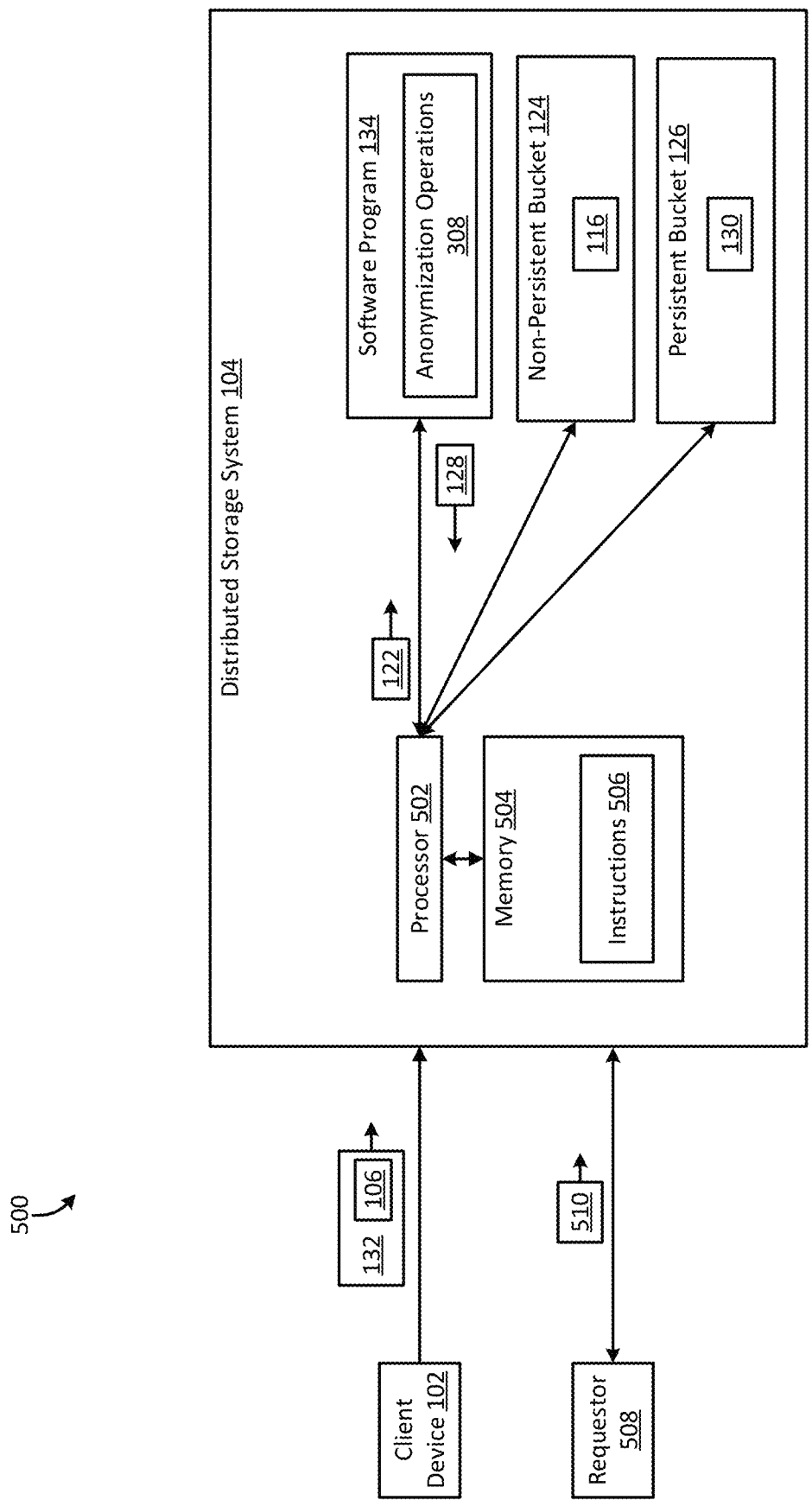
FIG. 5 shows a block diagram of another example of a system according to some aspects of the present disclosure.

FIG. 5 is a block diagram of an example of a system 500 according to some aspects of the present disclosure. The system 500 includes a processor 502 that is communicatively coupled to a memory 504. The processor 502 and the memory 504 can be configured to implement at least some of the functionality described above with respect to the gateway 108.

In some examples, the processor 502 and the memory 504 can be part of the same computing device. For example, the processor 502 and the memory 504 can be part of the same node, such as the gateway 108. In other examples, the processor 502 and the memory 504 can be distributed from (e.g., remote to) one another.

The processor 502 can include one processor or multiple processors. Non-limiting examples of the processor 502 include a Field-Programmable Gate Array (FPGA), an application-specific integrated circuit (ASIC), or a microprocessor. The processor 502 can execute instructions 506 stored in the memory 504 to perform operations. The instructions 506 may include processor-specific instructions generated by a compiler or an interpreter from code written in any suitable computer-programming language, such as C, C++, C #, Java, or Python.

The memory 504 can include one memory or multiple memories. The memory 504 can be volatile or non-volatile. Non-volatile memory includes any type of memory that retains stored information when powered off. Examples of the memory 504 include electrically erasable and programmable read-only memory (EEPROM) or flash memory. At least some of the memory 504 includes a non-transitory computer-readable medium from which the processor 502 can read instructions 506. A computer-readable medium can include electronic, optical, magnetic, or other storage devices capable of providing the processor 502 with computer-readable instructions or other program code. Examples of a non-transitory computer-readable medium can include a magnetic disk, a memory chip, ROM, random-access memory (RAM), an ASIC, a configured processor, and optical storage.

The processor 502 can execute the instructions 506 to perform operations. For example, the processor 502 can receive an upload request 132 from a client device 102 for uploading data 106 to the distributed storage system 104. In response to receiving the upload request 132, the processor 502 can store the data 106 as an object 116 in a non-persistent bucket 124. The processor 502 can then transmit a notification 122 associated with the object 116 to a software program 134.

The software program 134 can be configured to receive the notification 122 and responsively perform operations. For example, the software program 134 can read the object 116 from the non-persistent bucket 124 in response to receiving the notification 122. The software program 134 can generate an anonymized version of the object 130 by performing one or more anonymization operations with respect to the object 116. The software program 134 can then store the anonymized version of the object 130 in a persistent bucket 126 of the distributed storage system 104. Subsequent to storing the anonymized version of the object 130 in the persistent bucket 126, the software program 134 can transmit a command 128 for causing the object 116 to be removed from the non-persistent bucket 124.

In some examples, the processor 502 can receive the command 128 for removing the object 116 from the non-persistent bucket 124. In response to receiving the command 128, the processor 502 can remove the object 116 from the non-persistent bucket 124. These operations are further described below with respect to FIG. 6.

Figure 6:
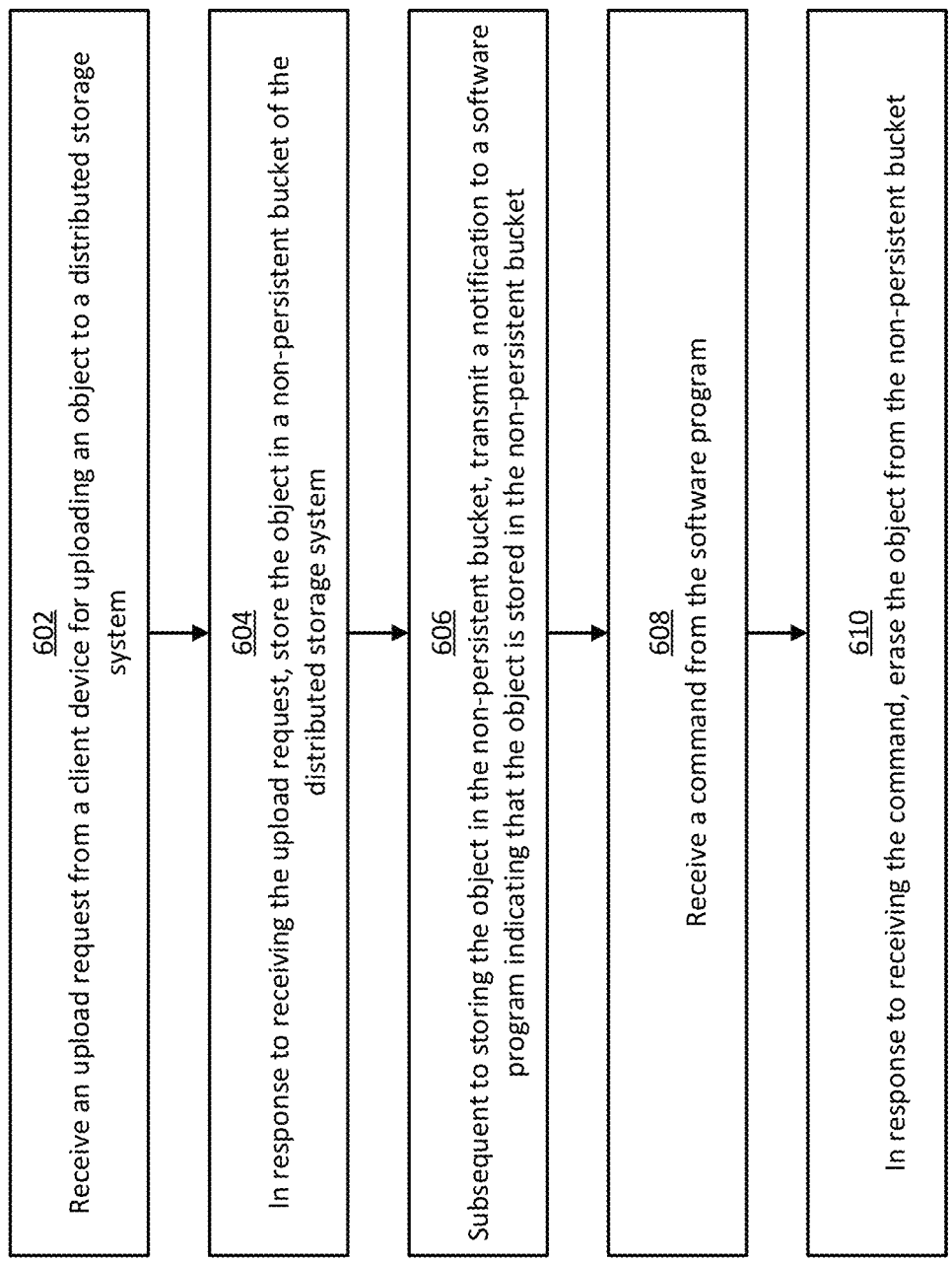
FIG. 6 shows a flow chart of an example of a process implemented by a gateway according to some aspects of the present disclosure.

FIG. 6 shows a flow chart of an example of a process implemented by a gateway 108 according to some aspects of the present disclosure. But other examples can include more steps, fewer steps, different steps, or a different order of the steps than is shown in FIG. 6. The steps of FIG. 6 are discussed below with reference to the components discussed above in relation to FIG. 5.

In block 602, the processor 502 receives an upload request 132 from a client device 102 for uploading data 106 to the distributed storage system 104. The processor 502 can receive the upload request 132 via a network such as the Internet.

In block 604, the processor 502 stores the data 106 as an object 116 in a non-persistent bucket 124 in response to receiving the upload request 132. Storing the object 116 in the non-persistent bucket 124 can involve the processor 502 directly or indirectly causing the object 116 to be stored in the non-persistent bucket 124. For example, the processor 502 can store the object 116 in a local volatile memory device that supports the non-persistent bucket 124. As another example, the processor 502 can transmit a write command to an API of the distributed storage system 104 for writing the object 116 to the non-persistent bucket 124. The distributed storage system 104 can receive the write command via the API and responsively store the object 116 in a volatile memory device supporting the non-persistent bucket 124. As another example, the processor 502 can transmit a write command to a storage node 114a or another node of the distributed storage system 104. The node can receive the write command and responsively write the object 116 to a volatile memory device supporting the non-persistent bucket 124.

In block 606, the processor 502 transmits a notification 122 associated with the object 116 to a software program 134, subsequent to storing the object 116 in the non-persistent bucket 124. For example, the processor 502 can directly or indirectly transmit the notification 122 to the software program 134. The notification 122 can indicate that the object 116 is stored in the non-persistent bucket 124.

In other examples, another component of the distributed storage system 104 can transmit the notification 122 to the software program 134. For example, a monitoring node of the distributed storage system 104 may monitor the content of the non-persistent bucket 124 to detect changes thereto. In response to detecting that the object 116 is stored in the non-persistent bucket 124, the monitoring node can transmit the notification 122 to the software program 134.

The software program 134 can receive the notification 122 and responsively perform one or more anonymization operations 308 with respect to the object 116. The software program 134 can then transmit a command 128 for causing the object 116 to be removed from the non-persistent bucket 124.

In block 608, the processor 502 receives the command 128 for removing the object 116 from the non-persistent bucket 124.

In block 610, the processor 502 removes the object 116 from the non-persistent bucket 124, in response to receiving the command 128. For example, the processor 502 can transmit a deletion instruction to a volatile memory device supporting the non-persistent bucket 124, which can cause the volatile memory device to remove the object 116 from the volatile memory device and thus the non-persistent bucket 124. As another example, the processor 502 can transmit a deletion instruction to an API of the distributed storage system 104 for removing the object 116 from to the non-persistent bucket 124. The distributed storage system 104 can receive the deletion instruction via the API and responsively remove the object 116 from the non-persistent bucket 124. As yet another example, the processor 502 can transmit a deletion instruction to a storage node 114a or another node of the distributed storage system 104. The node can receive the deletion instruction and responsively remove the object 116 from the non-persistent bucket 124.

Figure 7:
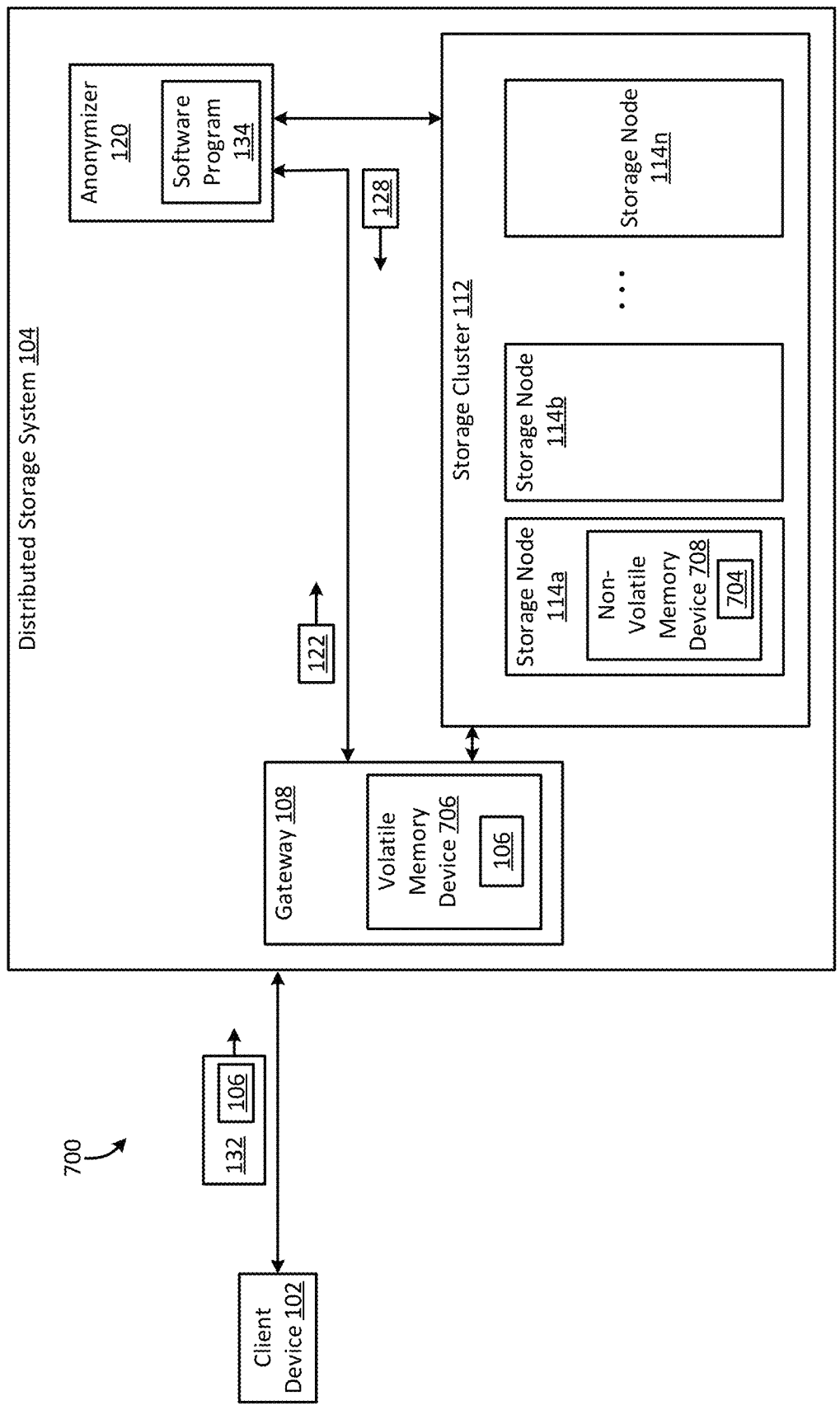
FIG. 7 shows a block diagram of an example of a system according to some aspects of the present disclosure.

FIG. 7 shows a block diagram of an example of a system 700 according to some aspects of the present disclosure. The system 700 includes a client device 102 and a distributed storage system 104, similar to FIG. 1. In some examples, the distributed storage system 104 can automatically anonymize data 106 from the client device 102 as follows.

The client device 102 can transmit an upload request 132 for uploading the data 106 to the distributed storage system 104. The upload request 132 can be received at the gateway 108. In response to receiving the upload request 132, the gateway 108 can store the data 106 in a volatile memory device 706. The gateway 108 can store the data 106 in the volatile memory device 706 using any suitable format, such as an object, block, or file format. In some examples, the volatile memory device 706 may be part of the gateway 108 as shown in FIG. 1.

Alternatively, the volatile memory device 706 may be located externally to the gateway 108. For example, the volatile memory device 706 can be coupled to a storage nodes 114a of the storage cluster 112 and accessible to the gateway 108. Regardless of the location of the volatile memory device 706, the gateway 108 can store the data 106 in in the volatile memory device 706 and transmit a notification 122 associated with the data 106 to the anonymizer 120. The notification 122 can indicate that the data 106 is stored in the volatile memory device 706.

At the anonymizer 120, the software program 134 can receive the notification 122 and responsively read the data 106 from the volatile memory device 706. The software program 134 can then execute one or more anonymization operations with respect to the data 106. For example, the software program 134 can extract the data 106 from the volatile memory device 706. The software program 134 can analyze the data 106 to identify sensitive information. For example, the software program 134 can perform image analysis, audio analysis, textual analysis, or any combination of these on the data 106 to identify sensitive information. Having identified the sensitive information, the software program 134 can then remove or obfuscate the sensitive information to generate an anonymized version of the data 704.

After generating the anonymized version of the data 704, the software program 134 can store the anonymized version of the data 704 in a non-volatile memory device 708. The software program 134 can store the anonymized version of the data 704 in any suitable format, such as an object, block, or file format. After storing the anonymized version of the data 704 in the non-volatile memory device 708, the software program 134 can transmit a command 128 to the distributed storage system 104 (e.g., a component of the distributed storage system 104) for causing the distributed storage system 104 to remove the data 106 from the volatile memory device 702. For example, the software program 134 can transmit the command 128 to the gateway 108, which can receive the command 128 and responsively remove the data 106 from the volatile memory device 702. Using these techniques, the distributed storage system 104 may only retain the anonymized version of the data 704 long-term to provide improved security and privacy.

After the data 106 is removed from the volatile memory device 706, the gateway 108 may receive a read request for the data 106 from a requestor. The read request can be for reading the data 106 from the distributed storage system 104. The requestor can be the client device 102 or another computing device. In response to the read request, the gateway 108 can retrieve the anonymized version of the data 704 from the non-volatile memory device 708 and transmit it to the requestor. As a result, the requestor cannot access the sensitive information in the original data 106.

Although FIG. 7 shows a certain number and arrangement of components, this is for illustrative purposes and intended to be non-limiting. Other examples may include more components, fewer components, different components, or a different arrangement of the components shown in FIG. 7.

Figure 8:
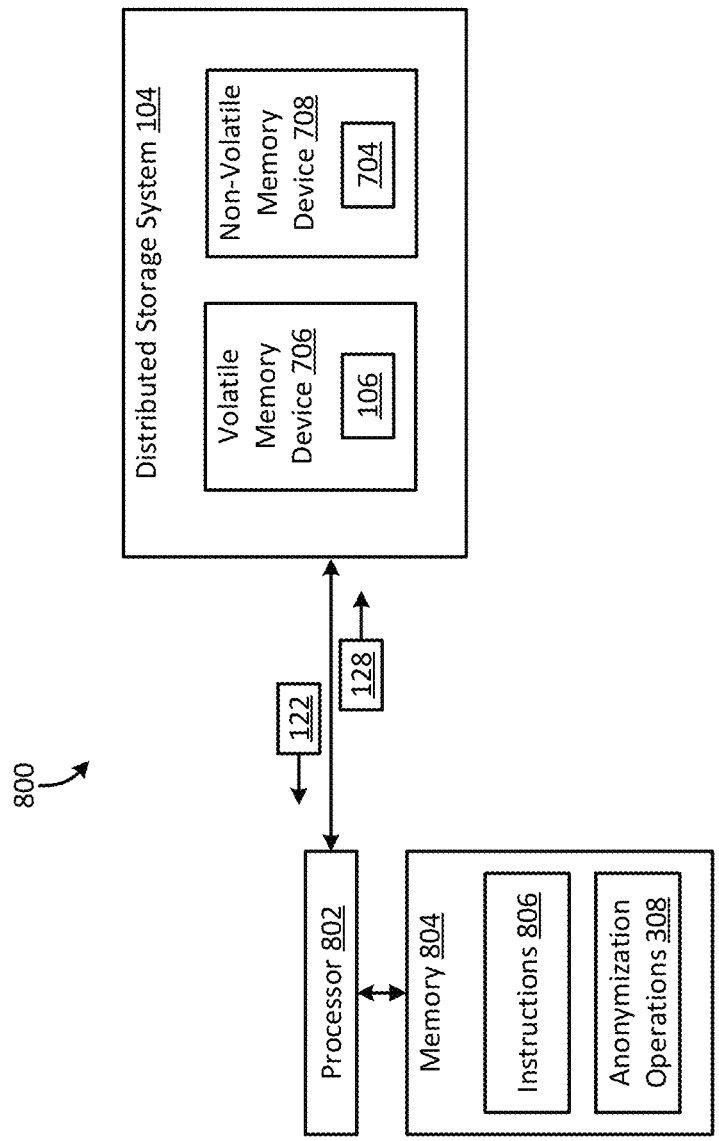
FIG. 8 shows a block diagram of another example of a system according to some aspects of the present disclosure.

FIG. 8 is a block diagram of an example of a system 800 according to some aspects of the present disclosure. The system 800 includes a processor 802 communicatively coupled to a memory 804. The processor 802 and the memory 804 can be similar to the processor 302 and the memory 304, respectively, of FIG. 3. The processor 802 and the memory 804 can also be configured to implement at least some of the functionality of the software program 134 described above.

Although shown as being external to the distributed storage system 104 in FIG. 8, in other examples the processor 802 and the memory 804 may be internal to the distributed storage system 104.

In some examples, the processor 802 and the memory 804 can be part of the same computing device. For example, the processor 802 and the memory 804 can be parts of the same node, such as the anonymizer 120 of FIG. 7. In other examples, the processor 802 and the memory 804 can be distributed from (e.g., remote to) one another.

The processor 802 can execute instructions 806 to perform operations. For example, the processor 802 can receive a notification 122 indicating that data 106 is stored in a volatile memory device 706 of a distributed storage system 104. The processor 802 can receive the notification 122 from a gateway 108 or another component of the distribute storage system 104. The data 106 can be stored in the volatile memory device 706 in any suitable format, for example as a block if the distributed storage system 104 is a block storage system or as a file if the distributed storage system 104 is a file storage system.

The processor 802 can read the data 106 from the volatile memory device 706 in response to receiving the notification 122. The processor 802 can then generate an anonymized version of the data 704 by performing one or more anonymization operations 308 with respect to the data 106. The processor 802 can store the anonymized version of the data 704 in a non-volatile memory device 708 of the distributed storage system 104. For example, the processor 802 can store the anonymized version of the data 704 in the non-volatile memory device 708 as a block if the distributed storage system 104 is a block storage system or a file if the distributed storage system 104 is a file storage system. The processor 802 can then transmit a command 128 for causing the data 106 to be removed from the volatile memory device 706. For example, the processor 802 can transmit the command 128 to the gateway 108 for causing the gateway 108 to remove the data 106 from the volatile memory device 706.

In some aspects, data can be anonymized in a distributed storage system according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by a processor for causing the processor to: receive a notification indicating that an object is stored in a non-persistent bucket of a distributed storage system; read the object from the non-persistent bucket in response to receiving the notification; generate an anonymized version of the object by performing one or more anonymization operations with respect to the object; store the anonymized version of the object in a persistent bucket of the distributed storage system; and transmit a command for causing the object to be removed from the non-persistent bucket.

Example #2: The non-transitory computer-readable medium of Example #1, wherein the distributed storage system is a Ceph storage system, and wherein the notification is received from an object storage gateway of the Ceph storage system, the object storage gateway including an interface for enabling a client device to upload data to the Ceph storage system.

Example #3: The non-transitory computer-readable medium of Example #2, further comprising program code that is executable by the processor for causing the processor to transmit the command to the object storage gateway of the distributed storage system for causing the object storage gateway to remove the object from the non-persistent bucket.

Example #4: The non-transitory computer-readable medium of any of Examples #1-3, wherein the one or more anonymization operations include erasing metadata associated with the object.

Example #5: The non-transitory computer-readable medium of any of Examples #1-4, wherein the object includes an image and the one or more anonymization operations include obscuring a portion of the image.

Example #6: The non-transitory computer-readable medium of any of Examples #1-5, wherein the program code defines a software program that is configured to be executed externally to the distributed storage system and to receive the notification over the Internet.

Example #7: A distributed storage system, comprising: a non-persistent bucket configured to store objects on a volatile memory device; a persistent bucket configured to store objects on a non-volatile memory device; a gateway configured to receive an upload request from a client device for uploading data to the distributed storage system and responsively: store the data as an object in the non-persistent bucket; and transmit a notification associated with the object to a software program; a processor; and a memory including instructions for the software program, the instructions being executable by the processor for causing the software program to: receive the notification from the gateway of the distributed storage system; read the object from the non-persistent bucket in response to receiving the notification; generate an anonymized version of the object by performing one or more anonymization operations with respect to the object; store the anonymized version of the object in the persistent bucket of the distributed storage system; and subsequent to storing the anonymized version of the object in the persistent bucket, transmit a command for causing the object to be removed from the non-persistent bucket.

Example #8: The distributed storage system of Example #7, wherein the distributed storage system is a Ceph storage system and the gateway is an object storage gateway of the Ceph storage system, the object storage gateway including an interface for enabling the client device to upload the data to the Ceph storage system.

Example #9: The distributed storage system of any of Examples #7-8, wherein the gateway is further configured to, subsequent to the object being removed from the non-persistent bucket: receive a request for the data from a requestor, the requestor being a computing device that is external to the distributed storage system; and in response to the request, read the anonymized version of the object from the persistent bucket and transmit the anonymized version of the object to the requestor.

Example #10: The distributed storage system of any of Examples #7-9, wherein the data includes transactional data and the one or more anonymization operations include obscuring a portion of the transactional data.

Example #11: The distributed storage system of any of Examples #7-9, wherein the data includes a video and the one or more anonymization operations include obscuring a portion of the video.

Example #12: The distributed storage system of any of Examples #7-11, wherein the software program includes a serverless function or a microservice.

Example #13: A method comprising: receiving, by a software program executing on a processor, a notification indicating that an object is stored in a non-persistent bucket of a distributed storage system; reading, by the software program, the object from the non-persistent bucket in response to receiving the notification; generating, by the software program, an anonymized version of the object by performing one or more anonymization operations with respect to the object; storing, by the software program, the anonymized version of the object in a persistent bucket of the distributed storage system; and transmitting, by the software program, a command for causing the object to be removed from the non-persistent bucket.

Example #14: The method of Example #13, wherein the distributed storage system is a Ceph storage system, and wherein the notification is received from an object storage gateway of the Ceph storage system, the object storage gateway including an interface for enabling a client device to upload data to the Ceph storage system.

Example #15: The method of Example #14, wherein the object storage gateway is configured to, subsequent to the object being removed from the non-persistent bucket: receive a request associated with the object from a requestor, the requestor being a computing device that is external to the distributed storage system; and in response to the request, read the anonymized version of the object from the persistent bucket and transmit the anonymized version of the object to the requestor.

Example #16: The method of any of Examples #13-15, wherein the software program is external to the distributed storage system, wherein the software program receives the notification from a gateway of the distributed storage system over the Internet, and wherein the software program transmits the command to the gateway over the Internet for causing the gateway to remove the object from the non-persistent bucket.

Example #17: The method of any of Examples #13-15, wherein the software program is internal to the distributed storage system.

Example #18: The method of any of Examples #13-17, wherein the one or more anonymization operations include erasing metadata associated with the object.

Example #19: The method of any of Examples #13-18, wherein the object includes an image or a video and the one or more anonymization operations include pixelating or blurring a portion of the object.

Example #20: The method of any of Examples #13-19, wherein the software program includes a serverless function or a microservice.

Example #21: A system comprising: a means for receiving a notification from a gateway of a distributed storage system, the notification indicating that an object is stored in a non-persistent bucket of the distributed storage system; a means for reading the object from the non-persistent bucket in response to receiving the notification; a means for generating an anonymized version of the object by performing one or more anonymization operations with respect to the object; a means for storing the anonymized version of the object in a persistent bucket of the distributed storage system; and a means for transmitting a command for causing the object to be removed from the non-persistent bucket.

Example #22: The system of Example #21, wherein the distributed storage system is a Ceph storage system and the gateway is an object storage gateway of the Ceph storage system, the object storage gateway including an interface for enabling a client device to upload data to the Ceph storage system.

Example #23: The system of any of Examples #21-22, wherein the one or more anonymization operations include erasing metadata associated with the object.

Example #24: The system of any of Examples #21-23, wherein the object includes an image and the one or more anonymization operations include obscuring a portion of the image.

Example #25: The system of any of Examples #21-24, wherein the gateway is configured to: store the object in the non-persistent bucket; and generate the notification based on the object being stored in the non-persistent bucket.

Example #26: The system of any of Examples #21-25, wherein the gateway is configured to remove the object from the non-persistent bucket in response to receiving the command.

Example #27: A distributed storage system, comprising: a processor; and a memory including instructions that are executable by the processor for causing the processor to: receive an upload request from a client device for uploading data to the distributed storage system; in response to receiving the upload request, store the data as an object in a non-persistent bucket; and transmit a notification associated with the object to a software program, the software program being configured to receive the notification and responsively: read the object from the non-persistent bucket in response to receiving the notification; generate an anonymized version of the object by performing one or more anonymization operations with respect to the object; store the anonymized version of the object in a persistent bucket of the distributed storage system; and subsequent to storing the anonymized version of the object in the persistent bucket, transmit a command for causing the object to be removed from the non-persistent bucket.

Example #28: The distributed storage system of Example #27, wherein the distributed storage system is a Ceph storage system, and wherein the instructions define an object storage gateway of the Ceph storage system, the object storage gateway including an interface for enabling the client device to upload the data to the Ceph storage system.

Example #29: The distributed storage system of any of Examples #27-28, wherein the software program is configured to transmit the command to a gateway of the distributed storage system for causing the gateway to remove the object from the non-persistent bucket.

Example #30: The distributed storage system of any of Examples #27-29, wherein the one or more anonymization operations include erasing metadata about the object.

Example #31: The distributed storage system of any of Examples #27-30, wherein the data is an image and the one or more anonymization operations include obscuring a portion of the image.

Example #32: The distributed storage system of any of Examples #27-31, wherein the software program includes a serverless function or a microservice.

Example #33: The distributed storage system of any of Examples #27-32, wherein the memory further includes instructions that are executable by the processor for causing the processor to: receive a request for the data from a requestor, the requestor being a computing device that is external to the distributed storage system; and in response to the request, read the anonymized version of the object from the persistent bucket and transmit the anonymized version of the object to the requestor.

Example #34: The distributed storage system of any of Examples #27-33, wherein the software program is external to the distributed storage system.

Example #35: A method comprising: receiving, by a processor, an upload request from a client device for uploading data to a distributed storage system; in response to receiving the upload request, storing, by the processor, the data as an object in a non-persistent bucket of the distributed storage system; and transmitting, by the processor, a notification associated with the object to a software program, wherein the software program is configured to receive the notification and responsively: read the object from the non-persistent bucket in response to receiving the notification; generate an anonymized version of the object by performing one or more anonymization operations with respect to the object; store the anonymized version of the object in a persistent bucket of the distributed storage system; and subsequent to storing the anonymized version of the object in the persistent bucket, transmit a command for causing the object to be removed from the non-persistent bucket.

Example #36: The method of Example #35, further comprising: receiving, by the processor, the command from the software program; and in response to receiving the command, erasing, by the processor, the object from the non-persistent bucket.

Example #37: The method of any of Examples #35-36, wherein the method is implemented by a gateway of the distributed storage system.

Example #38: A distributed storage system, comprising: a processor; and a memory including instructions that are executable by the processor for causing the processor to: receive a notification indicating that data is stored in a volatile memory device of the distributed storage system; read the data from the volatile memory device in response to receiving the notification; generate an anonymized version of the data by performing one or more anonymization operations with respect to the data; store the anonymized version of the data in a non-volatile memory device of the distributed storage system; and transmit a command for causing the data to be removed from the volatile memory device.

Example #39: A method comprising: receiving, by a processor, a notification indicating that data is stored in a volatile memory device of a distributed storage system; reading, by the processor, the data from the volatile memory device in response to receiving the notification; generating, by the processor, an anonymized version of the data by performing one or more anonymization operations with respect to the data; storing, by the processor, the anonymized version of the data in a non-volatile memory device of the distributed storage system; and transmitting, by the processor, a command for causing the data to be removed from the volatile memory device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A distributed storage system, comprising:
a processor; and
a memory including instructions that are executable by the processor for causing the processor to:
receive a notification indicating that data is stored in a volatile memory device of the distributed storage system;
read the data from the volatile memory device in response to receiving the notification;
generate an anonymized version of the data by performing one or more anonymization operations with respect to the data;
store the anonymized version of the data in a non-volatile memory device of the distributed storage system; and
transmit a command for causing the data to be removed from the volatile memory device.

2. The distributed storage system of claim 1, further comprising a gateway that includes an interface for enabling a client device to upload data to the distributed storage system.

3. The distributed storage system of claim 2, wherein the memory further includes instructions that are executable by the processor for causing the processor to:
transmit the command to the gateway of the distributed storage system for causing the gateway to remove the data from the volatile memory device.

4. The distributed storage system of claim 2, wherein the notification is received from the gateway.

5. The distributed storage system of claim 2, wherein the gateway is configured to, subsequent to the data being removed from the volatile memory device:
receive a request for the data from a requestor, the requestor being a computing device that is external to the distributed storage system; and
in response to the request, read the anonymized version of the data from the non-volatile memory device and transmit the anonymized version of the data to the requestor.

6. The distributed storage system of claim 1, wherein the one or more anonymization operations include erasing metadata associated with the data.

7. The distributed storage system of claim 1, wherein the data includes an image and the one or more anonymization operations include obscuring a portion of the image.

8. The distributed storage system of claim 1, wherein the data includes transactional data and the one or more anonymization operations include obscuring a portion of the transactional data.

9. The distributed storage system of claim 1, wherein the data includes a video and the one or more anonymization operations include obscuring a portion of the video.

10. A method comprising:
receiving, by a processor, a notification indicating that data is stored in a volatile memory device of a distributed storage system;
reading, by the processor, the data from the volatile memory device in response to receiving the notification;
generating, by the processor, an anonymized version of the data by performing one or more anonymization operations with respect to the data;
storing, by the processor, the anonymized version of the data in a non-volatile memory device of the distributed storage system; and
transmitting, by the processor, a command for causing the data to be removed from the volatile memory device.

11. The method of claim 10, wherein the notification is received from a gateway, the gateway including an interface for enabling a client device to upload data to the distributed storage system.

12. The method of claim 11, further comprising transmitting the command to the gateway of the distributed storage system for causing the gateway to remove the data from the volatile memory device.

13. The method of claim 11, wherein the gateway is configured to, subsequent to the data being removed from the volatile memory device:
receive a request for the data from a requestor, the requestor being a computing device that is external to the distributed storage system; and
in response to the request, read the anonymized version of the data from the non-volatile memory device and transmit the anonymized version of the data to the requestor.

14. The method of claim 10, wherein the one or more anonymization operations include erasing metadata associated with the data.

15. The method of claim 10, wherein the data includes an image and the one or more anonymization operations include obscuring a portion of the image.

16. The method of claim 10, wherein the data includes transactional data and the one or more anonymization operations include obscuring a portion of the transactional data.

17. The method of claim 10, wherein the data includes a video and the one or more anonymization operations include obscuring a portion of the video.

18. A non-transitory computer-readable medium comprising program code that is executable by one or more processors for causing the one or more processors to:
receive a notification indicating that data is stored in a volatile memory device of a distributed storage system;
read the data from the volatile memory device in response to receiving the notification;
generate an anonymized version of the data by performing one or more anonymization operations with respect to the data;
store the anonymized version of the data in a non-volatile memory device of the distributed storage system; and
transmit a command for causing the data to be removed from the volatile memory device.

19. The non-transitory computer-readable medium of claim 18, wherein the notification is received from a gateway, the gateway including an interface for enabling a client device to upload data to the distributed storage system.

20. The non-transitory computer-readable medium of claim 18, wherein the program code defines a software program that is configured to be executed externally to the distributed storage system and to receive the notification over the Internet.

* * * * *